(12) United States Patent
Röer

(10) Patent No.: US 10,833,562 B2
(45) Date of Patent: Nov. 10, 2020

(54) SEGMENT SHEET FOR A STATOR LAMINATION STACK, STATOR LAMINATION STACK, AND GENERATOR AND WIND TURBINE HAVING SAME

(71) Applicant: Wobben Properties GmbH, Aurich (DE)

(72) Inventor: Jochen Röer, Ganderkesee (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/331,711

(22) PCT Filed: Sep. 7, 2017

(86) PCT No.: PCT/EP2017/072428
§ 371 (c)(1),
(2) Date: Mar. 8, 2019

(87) PCT Pub. No.: WO2018/046583
PCT Pub. Date: Mar. 15, 2018

(65) Prior Publication Data
US 2019/0207476 A1   Jul. 4, 2019

(30) Foreign Application Priority Data
Sep. 9, 2016   (DE) .......................... 10 2016 217 173

(51) Int. Cl.
*H02K 5/18* (2006.01)
*H02K 7/18* (2006.01)
(Continued)

(52) U.S. Cl.
CPC ............. *H02K 7/1838* (2013.01); *F03D 9/25* (2016.05); *H02K 1/16* (2013.01); *H02K 1/185* (2013.01);
(Continued)

(58) Field of Classification Search
CPC ...... H02K 7/1838; H02K 1/185; H02K 1/148; H02K 5/18
See application file for complete search history.

(56) References Cited

U.S. PATENT DOCUMENTS 7,839,048 B2 * 11/2010 Jansen .................... H02K 1/146
310/156.37
8,492,951 B2   7/2013 Zirin et al.
(Continued)

FOREIGN PATENT DOCUMENTS

CN    201113573 Y    9/2008
CN    204615540 U    9/2015
(Continued)

*Primary Examiner* — Dang D Le
(74) *Attorney, Agent, or Firm* — Seed Intellectual Property Law Group LLP

(57) ABSTRACT

A segment plate for a stator lamination assembly of a generator of a wind turbine, and a base plate in the form of a ring segment, wherein the segment plate has a first radial portion in which recesses are provided for receiving a stator winding and radially adjacent to the first radial portion a second radial portion forming a segment of a magnetic yoke of the generator. In particular adjacent to the second radial portion the segment plate has a third radial portion forming a segment of a stator carrier structure of the generator and which in particular is adapted in conjunction with the third radial portions of further segment plates to form the stator carrier structure of the generator. A stator lamination assembly, a generator and a wind turbine, each having such segment plates.

12 Claims, 3 Drawing Sheets

(51) Int. Cl.
   *H02K 1/16*     (2006.01)
   *H02K 1/18*     (2006.01)
   *H02K 1/20*     (2006.01)
   *F03D 9/25*     (2016.01)

(52) U.S. Cl.
   CPC .............. *H02K 1/187* (2013.01); *H02K 1/20* (2013.01); *Y02E 10/725* (2013.01)

(56) References Cited

U.S. PATENT DOCUMENTS

| | | |
|---|---|---|
| 8,716,915 B2 | 5/2014 | Radov et al. |
| 8,981,609 B2 | 3/2015 | Joeckel |
| 2011/0001320 A1* | 1/2011 | Lagerweij ............ H02K 7/1838 290/55 |
| 2011/0210560 A1 | 9/2011 | Mancuso et al. |
| 2012/0133145 A1 | 5/2012 | Longtin et al. |
| 2013/0313835 A1 | 11/2013 | Gudewer |

FOREIGN PATENT DOCUMENTS

| | | |
|---|---|---|
| DE | 102008063783 A1 | 6/2010 |
| EP | 2424077 A2 | 2/2012 |
| JP | 2009171785 A | 7/2009 |
| JP | 2012105487 A | 5/2012 |
| JP | 2014183602 A | 9/2014 |
| JP | 2014197970 A | 10/2014 |
| KR | 100492662 B1 | 6/2005 |
| RU | 2507662 C2 | 2/2014 |

\* cited by examiner

SEGMENT SHEET FOR A STATOR LAMINATION STACK, STATOR LAMINATION STACK, AND GENERATOR AND WIND TURBINE HAVING SAME

BACKGROUND

Technical Field

The invention concerns a segment plate for a stator lamination assembly of a generator of a wind turbine, comprising a base plate in the form of a ring segment, wherein the segment plate has a first radial portion in which recesses are provided for receiving a stator winding and radially adjacent to the first radial portion a second radial portion forming a segment of a magnetic yoke of the generator. The invention further concerns a stator lamination assembly of a generator of a wind turbine, as well as a generator of a wind turbine, and a wind turbine.

Description of the Related Art

Wind turbines are generally known. They are used to convert energy in the wind into electric power by means of an electric generator. A core component for that task is the generator in wind turbines. The generator has a generator stator and a generator rotor which rotates relative thereto, also referred to as the "rotor member". The invention concerns both wind turbines and generators having internal rotor members and also external rotor members, which is used to mean that, in the case of an internal rotor member, the generator rotor rotates internally in an annular stator while in the case of an external rotor member the generator rotor rotates externally around the stator.

The generator stator has a stator winding in which an electric voltage is induced by means of the rotating generator rotor. The stator winding is accommodated in grooves provided in turn in the stator, for example in a stator ring.

It is generally known for the component which accommodates the stator winding to be formed from one or more stator lamination assemblies. Those stator lamination assemblies are formed by segment plate which are fitted together to constitute rings and are stacked one upon the other to form the lamination stack assembly.

In that respect in the state of the art the mechanical instability of the individual plates could be only partially compensated by the plates being stacked to form stack assemblies and joined together. Hitherto to support the stator lamination assemblies a support structure always had to be provided on the stator, generally a welded or cast unit which stiffens the stator lamination assemblies.

That circumstance necessitates a certain depth of manufacture on the part of the wind turbine manufacturer, as well as comparatively high costs and a high level of manufacturing complication and expenditure. That was considered to be in need of improvement.

On the priority application from which priority is claimed for the present application the German Patent and Trade Mark Office searched the following state of the art: DE 10 2008 063 783 A1 and EP 2 424 077 A2.

BRIEF SUMMARY

Provided is a way of reducing the manufacturing costs and complexity and expenditure for wind turbines without compromising the mechanical integrity of the generator stator of the wind turbine.

Provided is a segment plate. Adjacent to a second radial portion of the segment plate has a third radial portion forming a segment of a stator carrier structure of the generator. In particular the third radial portion is therefore adapted in conjunction with the third radial portions of further segment plates to form the stator carrier structure of the generator. In that respect the approach of making an additional external structure redundant by providing that the stator lamination assemblies which are formed from the segment plates are self-supporting, that is to say do not require any external attachment components for ensuring mechanical integrity. For that purpose the segment plate is radially enlarged adjacent to the region which is to provide the magnetic yoke and it has a carrier structure which enhances the stability of a plate ring formed from its segment plates.

An advantageous development of the segment plate in regard to the stator carrier structure provides that in the third radial portion are a plurality of reinforcing struts, wherein the reinforcing struts are adapted to carry compressive, tensile and shearing forces.

Further preferably provided in the third radial portion are a plurality of through openings which are adapted for the passage of corresponding bracing elements. The through openings are preferably arranged along two or more mutually spaced circular arc lines, wherein the arc lines are preferably formed concentrically. Particularly preferably in an embodiment having a first arc line and a second arc line the through openings on a first arc line are arranged displaced in the peripheral direction relative to the through openings on a second arc line. Further preferably the through openings are arranged in equidistantly spaced relationship on their respective arc lines. That arrangement has the following advantage: the segment plates can be stacked one upon the other in overlapping relationship so that the "seam locations" between the segment plates adjoining each other in a ring plane are displaced relative to each other. At the same time the equidistant, in particular two-row or multi-row arrangement of the through openings, permits axial bracing of the overlapping segment plates. The friction adhesion produced thereby between the plates significantly enhances the load-carrying capacity of the stator lamination assemblies and contributes to an improved damping characteristic in respect of acoustic vibrations which are emitted in operation of the wind turbine.

The bracing elements are adapted to fixedly connect stacked segment plates together. Preferably the bracing elements are in the form of threaded rods, screws, tensioning cables or the like. Preferably, in the bracing context, arranged on the bracing elements at the ends are pressure distribution elements which are adapted to distribute the tensioning forces to the largest possible surface area of the segment plates. The pressure distribution elements are for example in the form of discs, rings, ring segments, sleeves or the like. Further preferably arranged in the third radial portion are a plurality of material weakenings or recesses disposed between the reinforcing struts. The material weakenings or recesses preferably afford the effect of a reduction in weight.

Particularly preferably the reinforcing struts in the third radial portion are formed from the same thickness of material as the base plate in the first and/or second radial portion. The structure of the reinforcing struts is preferably obtained by means of laser cutting, water jet cutting, embossing or—particularly preferably—stamping.

Particularly preferably the recesses in the first radial portion, the through openings and the reinforcing struts in the third radial portion are respectively formed by means of stamping of the base plate, wherein, in the case of the reinforcing struts, material regions adjacent to the struts to be formed are embossed or stamped out.

In a preferred configuration of the segment plate the reinforcing struts have a plurality of first struts which are non-radially oriented. In that respect the term non-radially is used to mean that the segment plate is curved about a central axis and the first struts respectively define an angle of >0 degree with a radius extending through the central axis. Preferably the first struts are respectively oriented non-radially with alternate angles and form a lattice-like structure.

Further preferably the reinforcing struts have a plurality of second struts which are oriented radially. In that respect the radial orientation is with respect to the central axis of the segment plate.

In a particularly preferred embodiment respectively adjacent first struts are oriented in angular relationship with each other, and the through openings are respectively arranged at the point of intersection of the directions in which two adjacent first struts respectively extend. In other words the through openings are disposed at the origin of the angle between adjacent first struts.

In a further preferred embodiment the second struts are of a tapered configuration in the direction of the central axis or in the direction of the radially inward side of the segment plate.

Preferably the first and second struts are such that at least some of the first and second struts open into each other or cross each other. That provides a mesh-like carrier structure which links low weight with high mechanical load-bearing capacity.

In particular in those embodiments in which recesses are provided between the struts the struts act at the same time as cooling ribs and the recesses as cooling passages. That provides for improved heat dissipation from the grooves accommodating the stator winding, in the direction of the machine carrier.

Provided is a stator lamination assembly for a generator of a wind turbine. The stator lamination assembly has a multiplicity of segment plate, wherein a plurality of segment plates are arranged at each other in a plane in such a way that they jointly form a plate ring, and a plurality of segment plates are stacked in the plate rings formed in such a way that they jointly form the stator lamination assembly, wherein the stator lamination assembly has a first radial portion in which there are provided a multiplicity of grooves for receiving a stator winding, wherein the grooves are formed by recesses provided in the segment plates, and adjacent to the first radial portion have a second radial portion forming a magnetic yoke of the generator. Adjacent to the second radial portion the stator lamination assembly has a third radial portion forming a stator carrier structure of the generator.

A further development provides that the segment plates are in accordance with one of the above-described preferred embodiments.

After the invention has been described hereinbefore with further reference to the stator lamination assembly a generator according to the invention is described in detail hereinafter.

Provided is a generator of a wind turbine, in particular a slowly rotating synchronous ring generator, which has a generator stator, a generator rotor mounted rotatably relative to the generator stator, and a machine carrier for fixing the generator stator to the wind turbine, wherein the generator stator has at least one stator lamination assembly in which there are provided a multiplicity of grooves in which the stator winding is received. The generator stator has at least one stator lamination assembly which is in accordance with one of the above-described preferred embodiments and correspondingly includes segment plates. In accordance with the invention the term slowly rotating generator is used to denote a generator having a nominal rotary speed of 50 revolutions per minute or less.

Finally in a further aspect the invention concerns a wind turbine, in particular a gear-less wind turbine, comprising a pylon, a pod arranged rotatably on the pylon, a machine carrier arranged at the pod, a hub mounted rotatably on the pod and having a number of rotor blades, in particular three rotor blades, and a generator for producing electric power which has a generator rotor connected to the hub and a generator stator connected to the machine carrier.

The generator is preferably alternatively in the form of an internal rotor generator or an external rotor generator. If the generator is an internal rotor generator the first radial portion of the stator lamination assembly or the stator plate represents the radially inward ring region while the third radial portion represents the radially outer ring portion. In the case of an external rotor generator the situation is precisely the reverse.

BRIEF DESCRIPTION OF THE SEVERAL VIEWS OF THE DRAWINGS

The invention is described in greater detail hereinafter by means a preferred embodiment with reference to the accompanying Figures in which.

DETAILED DESCRIPTION

Figure 1:
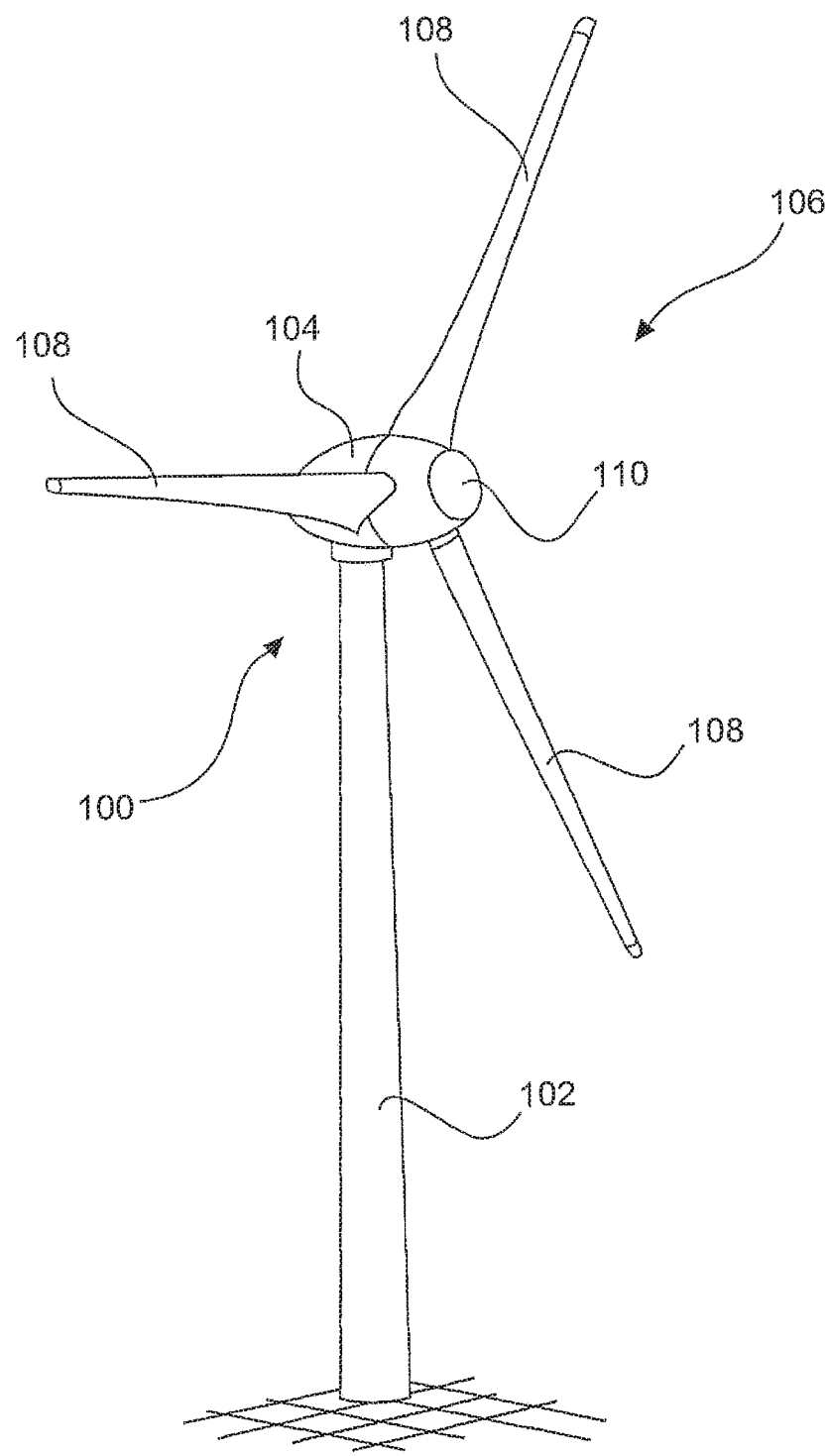
FIG. 1 shows a diagrammatic perspective view of a wind turbine.

FIG. 1 shows a wind turbine 100 comprising a pylon 102 and a pod 104. Arranged at the pod 104 is a rotor 106 having three rotor blades 108 and a spinner 110. The rotor 106 is caused to rotate in operation by the wind and thereby drives a generator 1 (FIG. 2) in the pod 104.

Figure 2:
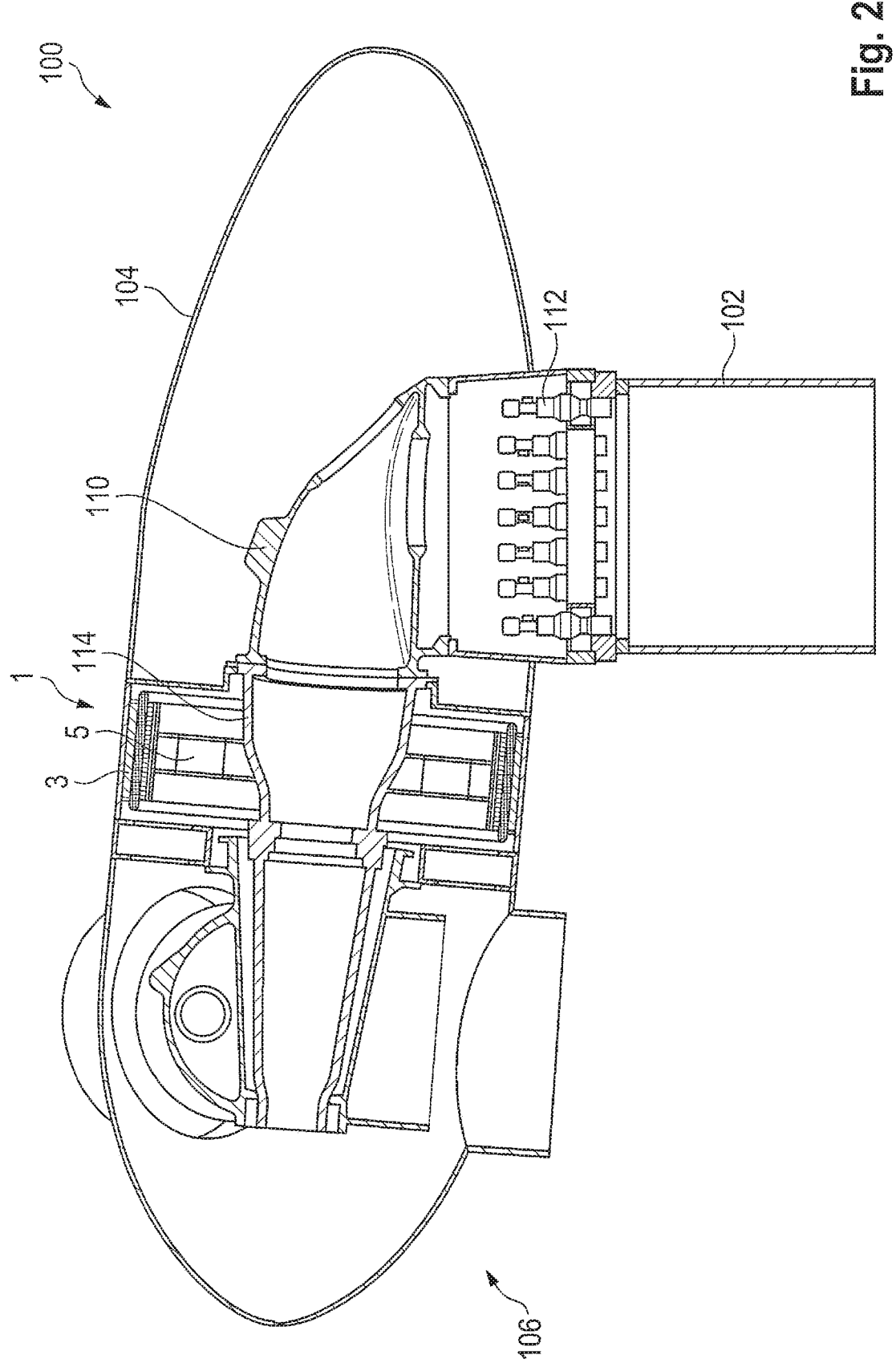
FIG. 2 shows a partly sectioned diagrammatic view of a pod of the wind turbine of FIG. 1.

The pod 104 is shown in section in FIG. 2. The pod 104 is mounted rotatably to the pylon 102 and is connected in driving relationship by means of an azimuth drive 112 in generally known manner. Arranged in the pod 104 also in generally known manner is a machine carrier 110 carrying a journal 114.

The generator 1 has a generator stator 5 fixed by means of the journal 114 to the machine carrier 110 in the pod 104. Other possible configurations which are not excluded by the invention provide for example that the generator stator 5 is joined directly to the machine carrier 110 or a corresponding component of the pod 104.

The generator 1 shown in FIG. 2 has a generator rotor 3 which is designed in the form of an external rotor member. Alternative possible configurations which are not excluded from the invention also provide for example a generator rotor in the form of an internal rotor member.

Figure 3:
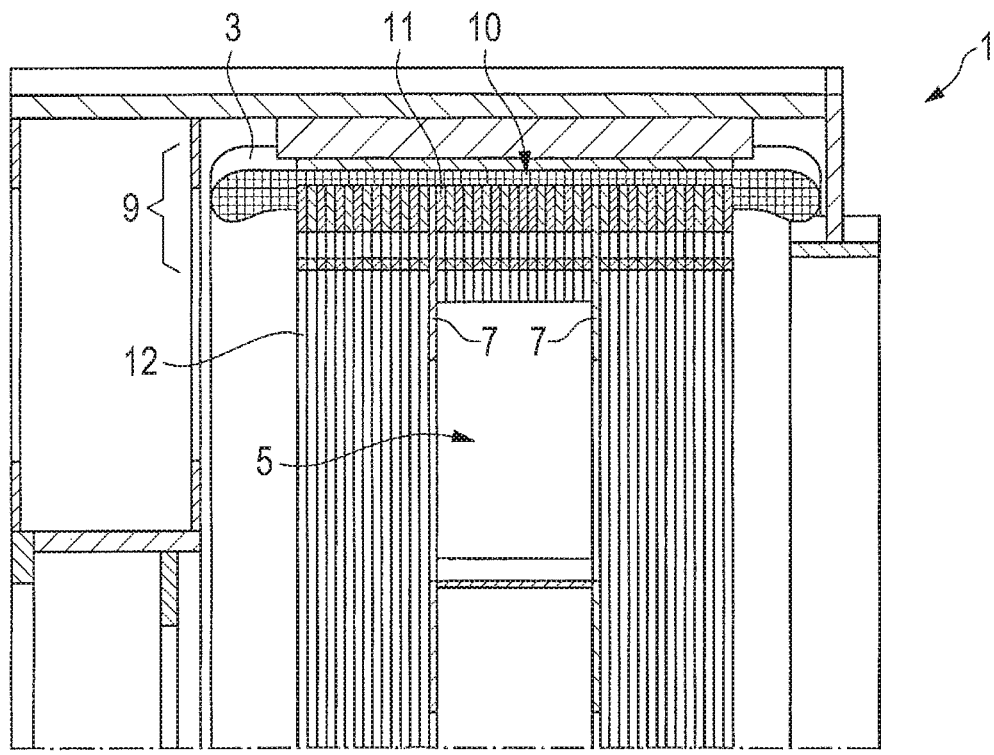
FIG. 3 shows a view on an enlarged scale of part of the view of FIG. 2.

The generator rotor 3 is non-rotatably connected to the hub 106. Closer details of the structure of the generator stator 5 are shown in FIG. 3. The generator 5 has a stator ring 9. The generator rotor 3 runs outside the stator ring 9, spaced therefrom by an annular gap. The stator ring 9 is fixed to a stator mounting by means of two support rings 7. The stator mounting is in turn screwed to the journal 114. Other possible fixing arrangements for securing the stator 5 to the machine carrier are also within the scope of the invention.

The support rings 7 are comparatively thin-gauge plates which leave the load-carrying capability and mechanical stiffness of the stator ring 9 substantially uninfluenced. Instead the stator ring 9 is of a self-supporting nature.

The stator ring 9 is formed from a multiplicity of segment plates 11 which are fitted against each other to constitute plate rings 12 and are stacked one upon the other in such a way that at least one stator lamination assembly 10 is formed.

Figure 4:
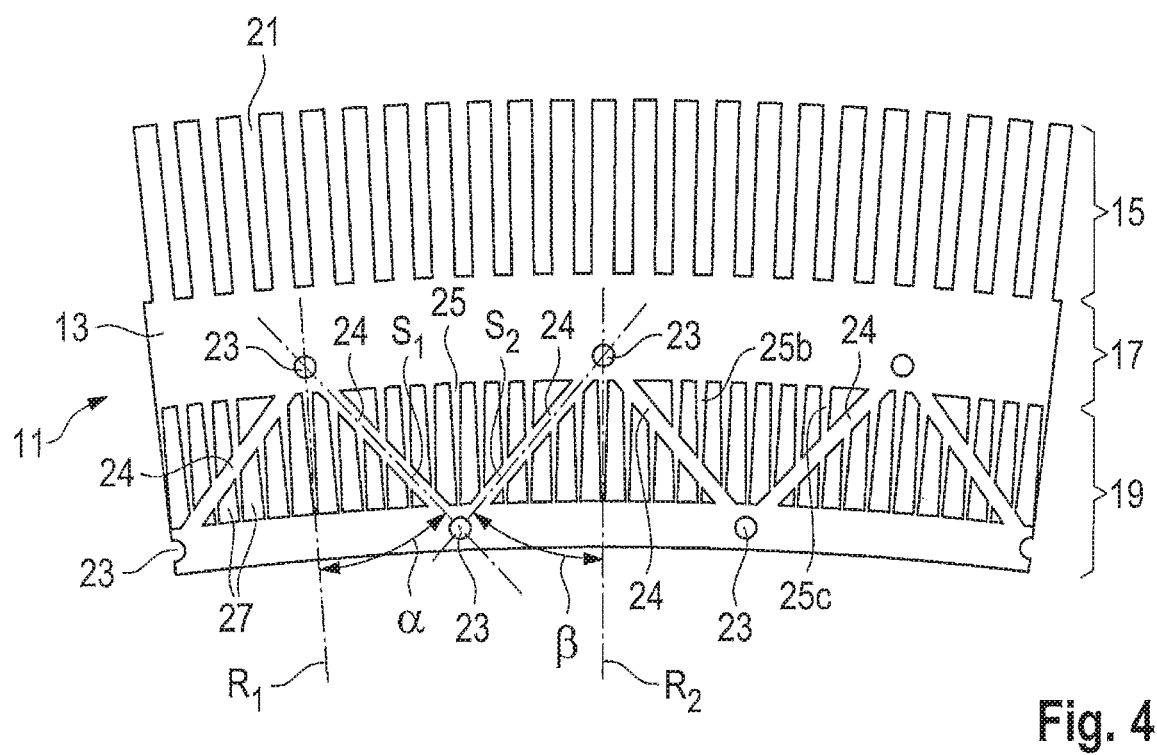
FIG. 4 shows a diagrammatic plan view of a segment plate for a stator lamination assembly of a generator of a wind turbine as shown in FIGS. 1 to 3.

The structure of a segment plate is shown in FIG. 4.

The segment plate 11 shown in FIG. 4 has a base plate 13. The segment plate 11 is of a configuration in the form of a ring segment, that is to say it is of a circular arcuate configuration curved around a central axis (not shown). The segment plate 11, shown in FIG. 4 in the form of a segment plate for an external rotor member, has a first radial portion 15 in which there are a multiplicity of recesses 21. The recesses 21 are adapted to receive the stator winding.

Adjacent to the first radial portion 15 the segment plate 11 has a second radial portion 17 forming a segment of the magnetic yoke of the generator stator 5 (FIGS. 1 to 3).

The magnetic yoke is also referred to as a magnetic return member. Adjacent to the second radial portion 17 the structure of the segment plate 11 is enlarged by a third radial portion 19. The third radial portion 19 has a multiplicity of through openings 23 for the passage of bracing means, like for example threaded rods, screws, tensioning cables and the like.

Arranged in the third radial portion 19 are a multiplicity of reinforcing struts 24, 25 which stiffen the segment plate 11 and are adapted, in the assembled condition, to stiffen the stator lamination assembly and the stator ring 9 in order to make it capable of carry a load in itself. The reinforcing struts 24, 25 have a multiplicity of first struts 24 which are non-radially oriented. The first struts 24 respectively define an angle $\alpha$ $\beta$ with the radii $R_1$, $R_2$. The angle $\alpha$ can be of the same value as the angle $\beta$.

Unlike the first struts 24 the second struts 25 are oriented radially. Preferably the second struts 25 extend in a tapered configuration in the direction of the central axis (not shown). Among the first struts 25 there are at least some struts 25b which open into at least one first strut 24, and some struts 25c which respectively cross at least one first strut 24.

In a particularly preferred configuration the struts 24, 25 are formed by stamping out a plurality of recesses 27 from the base plate 13. Preferably both the recesses 21 and also the through openings 23 and the recesses 27 are produced from the base plate 13 by means of stamping.

The through openings 23 are preferably disposed at the origin of the angles $\alpha$, $\beta$ of the first struts 24 or are in alignment with the intersection points of the directions in which two respectively adjacent first struts 24 extend.

While the configuration shown in FIGS. 1 to 4 is explicitly directed to a generator 1 having an external rotor it is to be appreciated that generators with an internal rotor are at any event also embraced, in which the same basic principles as described hereinbefore with reference to the external rotor also apply. The first radial portion 15 having the recesses 21 for receiving the stator winding is then however arranged not radially outwardly but radially inwardly on the segment plate 11. A corresponding configuration applies for the second and third radial portions.

The invention claimed is:

1. A segment plate for a stator lamination assembly of a generator of a wind turbine, comprising:
   a base plate in a form of a ring segment,
   a first radial portion having a plurality of recesses for receiving a stator winding,
   radially adjacent to the first radial portion, a second radial portion forming a segment of a magnetic yoke of the generator, and
   adjacent to the second radial portion, a third radial portion forming a segment of a stator carrier structure of the generator,
   wherein the third radial portion has a plurality of reinforcing struts, wherein the plurality of reinforcing struts are adapted to carry compressive, tensile, and shearing forces,
   wherein the plurality of reinforcing struts have a plurality of second struts which are radially oriented.

2. The segment plate according to claim 1, wherein the third radial portion has a plurality of through openings adapted for passage of corresponding bracing elements.

3. The segment plate according to claim 2, wherein the plurality of reinforcing struts have a plurality of first struts which are non-radially oriented.

4. The segment plate according to claim 3,
   wherein respectively adjacent struts of the plurality of first struts are oriented in angular relationship with each other, and
   wherein the plurality of through openings are respectively arranged at a point of intersection of a direction in which two adjacent first struts respectively extend.

5. The segment plate according to claim 1, wherein a plurality of material weakenings or recesses are arranged in the third radial portion between the plurality of reinforcing struts.

6. The segment plate according to claim 1, wherein the plurality of second struts are tapered in a direction of a radially inward side of the segment plate.

7. The segment plate according to claim 3, wherein at least some of the plurality of first struts and the plurality of second struts open into each other or cross each other.

8. A stator lamination assembly for a generator of a wind turbine comprising:
   a plurality of segment plates arranged together in a plane and stacked to form a stacked plate ring, wherein each of the plurality of segment plates is the segment plate according to claim 1; and
   the first radial portion having the plurality of grooves for receiving the stator winding, wherein the grooves are formed by recesses in the plurality of segment plates.

9. A generator of a wind turbine, comprising:
   a stator winding; and
   a generator stator and a generator rotor mounted rotatably relative to the generator stator,
   wherein the generator stator has the stator lamination assembly according to claim 8, wherein the stator winding is received in the plurality of grooves.

10. A wind turbine comprising:
    a pylon;
    a pod arranged rotatably on the pylon;
    a hub mounted rotatably to the pod and having a plurality of rotor blades; and
    a generator configured to generate electric power, wherein the generator has a generator rotor coupled to the hub and a generator stator coupled to the pod, wherein the generator is the generator in accordance with claim 9.

11. The wind turbine according to claim 10, wherein the wind turbine is a gear-less wind turbine.

12. The wind turbine according to claim 10, wherein the generator is a synchronous ring generator.

* * * * *